United States Patent
Park et al.

(10) Patent No.: US 9,252,599 B2
(45) Date of Patent: Feb. 2, 2016

(54) METHOD FOR CONTROLLING ENERGY MANAGEMENT SYSTEM

(75) Inventors: Unsik Park, Changwon-si (KR); Kwangsoo Lee, Changwong-si (KR)

(73) Assignee: LG Electronics Inc., Seoul (KR)

( * ) Notice: Subject to any disclaimer, the term of this patent is extended or adjusted under 35 U.S.C. 154(b) by 1032 days.

(21) Appl. No.: 13/337,992

(22) Filed: Dec. 27, 2011

(65) Prior Publication Data
US 2012/0166013 A1 Jun. 28, 2012

(30) Foreign Application Priority Data
Dec. 28, 2010 (KR) .................. 10-2010-0136620

(51) Int. Cl.
*G05D 3/12* (2006.01)
*H02J 3/38* (2006.01)
*H02J 7/35* (2006.01)

(52) U.S. Cl.
CPC .. *H02J 3/383* (2013.01); *H02J 7/35* (2013.01); *Y02E 10/563* (2013.01); *Y02E 10/566* (2013.01)

(58) Field of Classification Search
CPC ............................. H02J 3/383; Y02E 10/563
USPC ................. 700/17, 286, 291, 295, 297, 300
See application file for complete search history.

(56) References Cited

U.S. PATENT DOCUMENTS

| | | | |
|---|---|---|---|
| 2008/0058998 A1* | 3/2008 | Breit | 700/295 |
| 2010/0138063 A1* | 6/2010 | Cardinal et al. | 700/291 |
| 2010/0198421 A1* | 8/2010 | Fahimi et al. | 700/291 |
| 2010/0204844 A1* | 8/2010 | Rettger et al. | 700/291 |
| 2011/0128760 A1* | 6/2011 | Yuan et al. | 363/50 |
| 2011/0208365 A1* | 8/2011 | Miller | 700/291 |
| 2011/0282600 A1* | 11/2011 | Roesner et al. | 702/60 |
| 2012/0049635 A1* | 3/2012 | Schelenz et al. | 307/82 |
| 2012/0106210 A1* | 5/2012 | Xu et al. | 363/37 |
| 2012/0120694 A1* | 5/2012 | Tsuchiya et al. | 363/97 |
| 2012/0134189 A1* | 5/2012 | Krein | 363/98 |

FOREIGN PATENT DOCUMENTS

| | | |
|---|---|---|
| JP | 2004-180467 | 6/2004 |
| JP | 2010-0233408 | 10/2010 |
| KR | 10-1999-0058507 | 7/1999 |
| KR | 10-2006-0022658 | 3/2006 |

* cited by examiner

*Primary Examiner* — Darrin Dunn
(74) *Attorney, Agent, or Firm* — KED & Associates LLP

(57) ABSTRACT

A method for controlling an energy management system, which includes a PV module for generating power and a battery for storing power and which is connected to a grid as an external power supplier and a power load as a power consumer, is provided to enable efficient energy management of the energy management system.

16 Claims, 15 Drawing Sheets

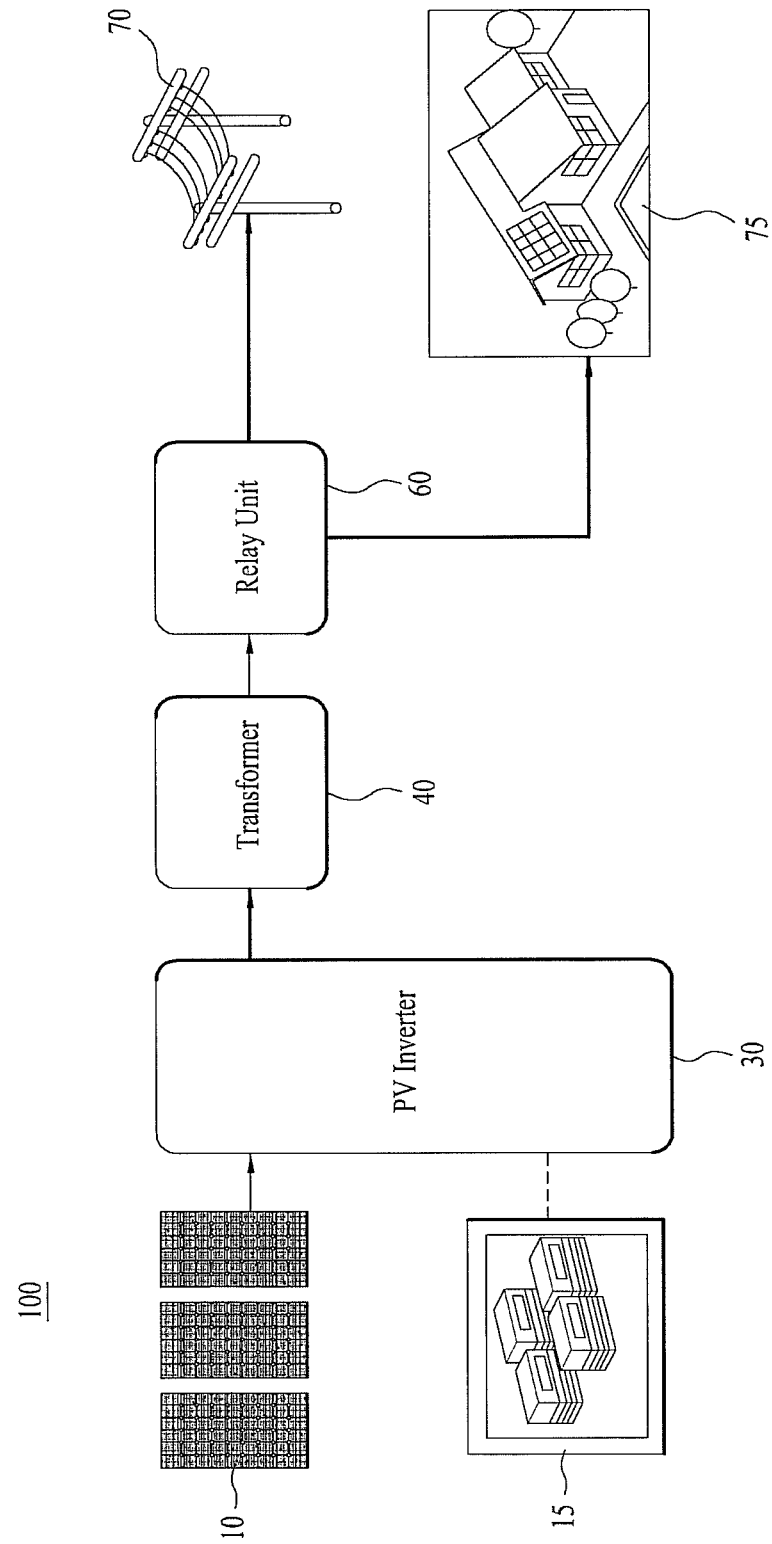

FIG. 13
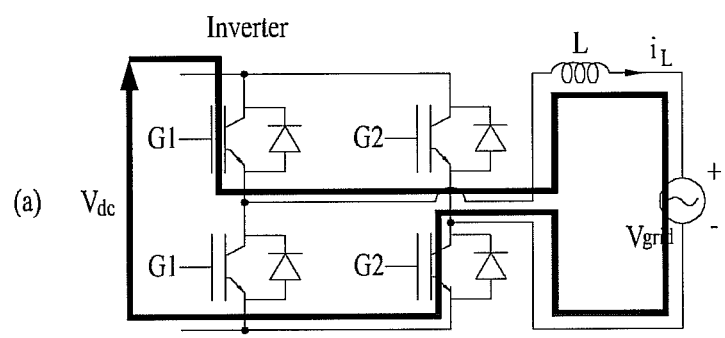
(a)
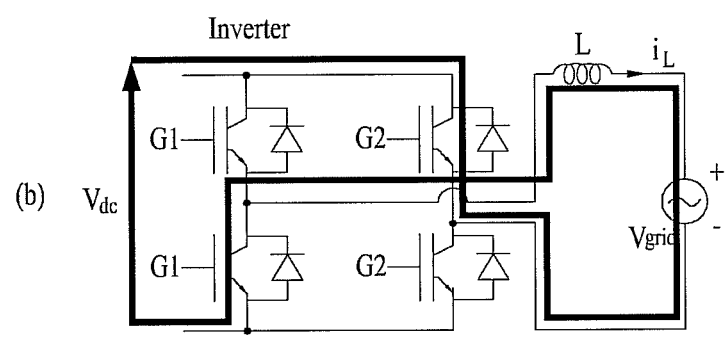
(b)

METHOD FOR CONTROLLING ENERGY MANAGEMENT SYSTEM

CROSS-REFERENCE TO RELATED APPLICATION(S)

This application claims the benefit of Korean Patent Application No. 10-2010-0136620, filed on Dec. 28, 2010, which is hereby incorporated by reference as if fully set forth herein.

BACKGROUND

1. Field

The present invention relates to a method for controlling an energy management system, and more particularly, to a method for controlling an energy management system, which enables efficient energy management of the energy management system which includes a photovoltaic (PV) module for generating power and a battery for storing power and which is connected to a grid as an external power supplier and a power load as a power consumer.

2. Background

Generally, a power supplier supplies power to each residence at a fixed price and charges a corresponding fee in a unilateral or unidirectional manner (i.e., only in a direction from the power supplier to the consumer). However, such a unidirectional power supply system has problems in that it is not possible to satisfy all demands associated with power supply of consumers and it is difficult to appropriately cope with various environmental changes. In terms of payment, such a system also has a problem in that the consumer has no choice but to follow prices set by the power supplier.

Also, there is a problem in that a power reserve rate may be significantly reduced when a peak time of power use is reached as power demand has significantly increased recently.

There are also demands and movements for changing the power supply system from unidirectional to bidirectional. A system, which allows consumers to generate and sell power back to the electrical power corporation as a power supplier, has already been introduced.

Especially, as renewable energy, which will replace fossil energy that is being exhausted, has been vigorously studied, many studies have also been conducted upon a system which allows power generated by processing renewable energy to be supplied in a bidirectional manner.

Such a bidirectional power supply system may also operate in association with a next-generation power system, which is implemented by combining an information communication technology and a modernized power technology, which has come to the fore recently, and a smart grid which is a system for managing the power system.

The smart grid has a zone in which power price varies with time. Discussions have been conducted upon methods which allow each residence, which has a power load as a final power consumer, to generate and store renewable energy. For example, each residence may be equipped with a renewable energy generation module such as a photovoltaic (PV) module, a wind power generation module, or a fuel power generation module to generate energy and may also be equipped with a Lithium-ion battery or the like as an energy storage module to store energy provided by the grid or to store energy that is not consumed in real time in the residence or the like from among energy generated by the renewable energy generation module.

Thus, there is a need to provide a method for controlling an energy management system to achieve reasonable power distribution and use between the components of a smart grid by efficiently distributing, storing, and supplying power generated by the final power consumer as a power load, the renewable energy generation module, the energy storage module, and the smart grid.

SUMMARY OF THE INVENTION

Accordingly, the present invention is directed to a method for controlling an energy management system that substantially obviates one or more problems due to limitations and disadvantages of the related art.

An object of the present invention is to provide a method for controlling an energy management system, wherein it is possible to efficiently manage the energy management system which is bidirectional.

Another object of the present invention is to provide a method for efficiently controlling an energy management system which includes a photovoltaic (PV) module for generating power and a battery for storing power and which is connected to a grid as an external power supplier and a power load as a power consumer.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling an energy management system, which includes a photovoltaic (PV) module for generating power and a battery for storing power and which is connected to a grid as an external power supplier and a power load as a power consumer, includes a power determination process including determining an amount of power generated by the PV module, an amount of power stored in the battery, an amount of power consumed by the power load, and an amount of power required by the grid, and a power distribution process including distributing the power generated by the PV module, the power stored in the battery, and the power supplied by the grid to the battery, the power load, or the grid according to the amount of generated power, the amount of stored power, the amount of consumed power, and the amount of required power determined in the power determination process.

The PV module is an example of a renewable energy generation module and may be replaced with a different renewable energy generation module such as a wind power generation module or a fuel cell module. That is, the PV module may be an energy generation module that generates energy at the side of a final power consumer.

The power determination process may be repeated at intervals of a predetermined time.

In addition, the power generated by the PV module may be preferentially supplied to the power load when the amount of power consumed by the power load determined in the power determination process is greater than a predetermined amount of consumed power and the amount of generated power determined in the power determination process is greater than a predetermined amount of generated power.

Further, an amount of power by which the power generated by the PV module exceeds the amount of power consumed by the power load may be supplied to the battery or the grid.

Here, the energy management system may supply power generated by the PV module to the grid upon receiving a power supply request signal from the grid.

In this case, the energy management system may supply the power supplied by the grid to the battery in the power distribution process upon determining that the amount of power stored in the battery determined in the power determination process is equal to or less than a first predetermined amount of stored power.

The power distribution process may include supplying power to the battery when a price of power supplied by the grid is equal to or less than a predetermined price.

Here, the method may further include a power price check process including checking a price of power supplied by the grid.

In this case, the power price check process may be repeated at intervals of a predetermined time.

Further, the power distribution process may be continued until the amount of power stored in the battery reaches a second predetermined amount of stored power.

Upon receiving a power supply request signal from the grid, the energy management system may supply power stored in the battery to the grid in the power distribution process.

Here, upon determining in the power determination process that the amount of power stored in the battery has been reduced to a predetermined amount of stored power, the energy management system may stop supplying power to the grid in the power distribution process.

In this case, upon determining in the power determination process that the amount of power consumed by the power load is equal to or greater than a predetermined amount of consumed power and the amount of power supplied by the grid is equal to or less than a predetermined amount of supplied power, the energy management system may supply power stored in the battery to the power load in the power distribution process.

Upon determining in the power determination process that the PV module and the battery operate abnormally, the energy management system may directly supply power from the grid to the power load in the power distribution process.

According to the embodiments of the present invention, it is possible to provide a method for controlling an energy management system which is bidirectional.

In addition, according to the method for controlling the energy management system according to the present invention, it is possible to efficiently connect a power generator, a power supplier, a power storage, and a power consumer depending on the circumstances, thereby improving the efficiency of energy management.

Further, according to the method for controlling the energy management system according to the present invention, it is possible to minimize power costs, thereby improving user convenience.

Furthermore, it is possible to selectively add energy generation modules and energy storage modules to the energy management system according to the present invention such that an energy generation module and an energy storage module can be added depending on circumstances of the power consumer, thereby improving user convenience.

BRIEF DESCRIPTION OF THE DRAWINGS

The embodiments will be described in detail with reference to the following drawings in which like reference numerals refer to like elements wherein:

FIG. 2 illustrates a first operational mode in which power generated by a PV module is supplied to a grid or power load;

FIG. 11 is an exemplary circuit diagram of the DC/AC inverter in the PV inverter in the energy management system according to the present invention and FIGS. 12 and 13 are exemplary graphs showing respective operations of portions of the DC/AC inverter.

DETAILED DESCRIPTION

Figure 1A:
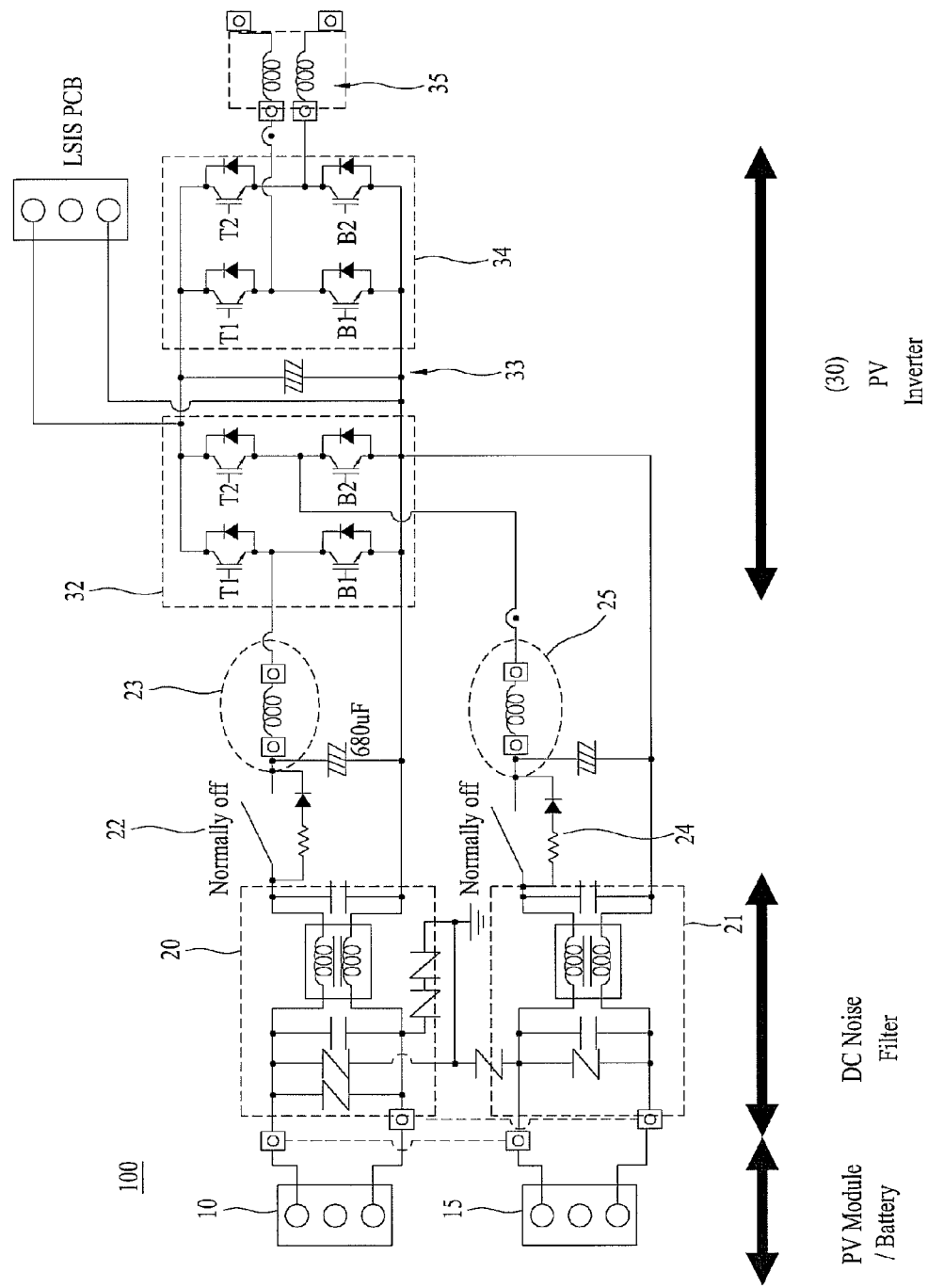
FIG. 1 is a block diagram illustrating an example of an energy management system according to the present invention.

Embodiments of the present invention will now be described in detail with reference to the accompanying drawings.

While the present invention permits a variety of modifications and changes, specific embodiments of the present invention illustrated in the drawings will be described below in detail. However, the detailed description is not intended to limit the present invention to the described specific forms. Rather, the present invention includes all modifications, equivalents, and substitutions without departing from the spirit of the invention as defined in the claims.

An embodiment of the present invention provides an energy management system and a method for controlling the same, which prevent overcharge/overdischarge of an energy storage device in a renewable energy processing system.

A preferred embodiment of the present invention is described below in more detail with reference to the accompanying drawings.

The present invention provides a method for controlling the energy management system 100, for example, a system for processing power generated from renewable energy such as small hydropower, photovoltaic (PV), solar thermal power, wind power, waste energy, bio energy, geo thermal power, or ocean energy. Such processed power generated from renewable energy is supplied to the electrical power corporation, i.e., a grid, which conventionally supplies power in a unilateral or unidirectional manner, a power load which consumes supplied power, an energy storage device such as a battery which can store energy, and the like, thereby implementing a bidirectional power supply system. Such a power supply system may operate in association with a smart grid.

The present invention will be described with reference to PV energy as an example of renewable energy and an energy management system as an example of the renewable energy processing system for better understanding and easy explanation of the invention.

Figure 1B:
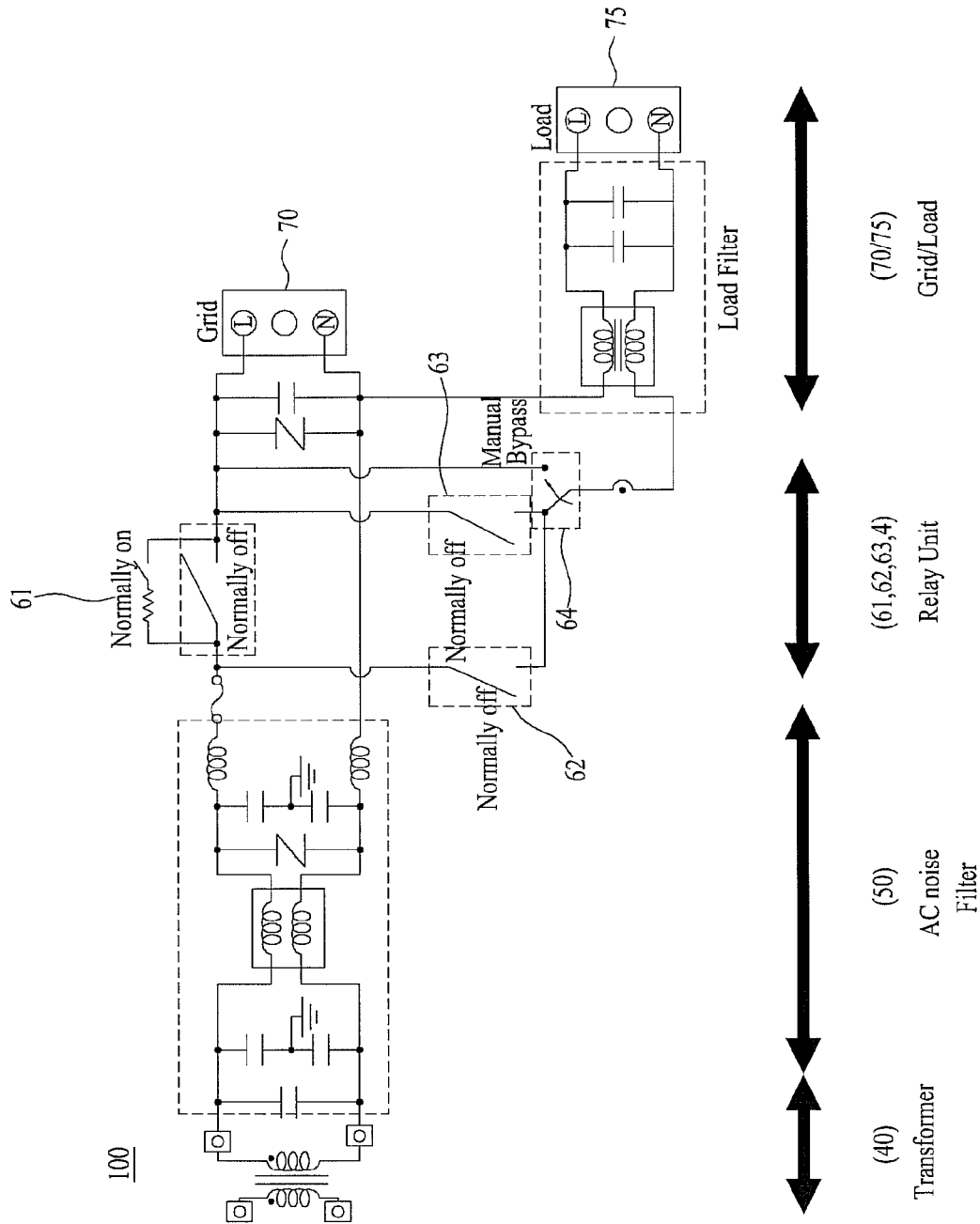
Figure 3:
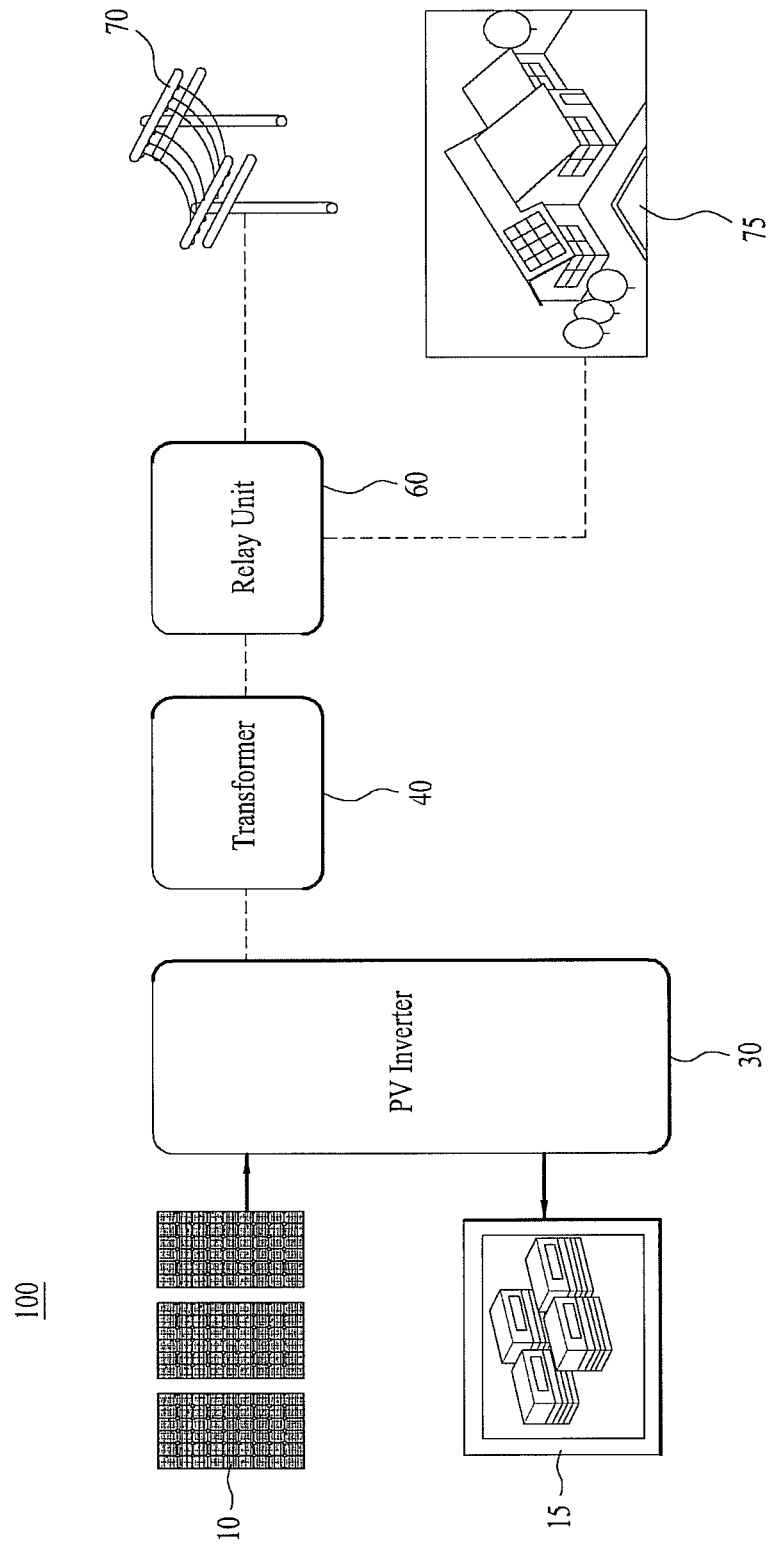
FIG. 3 illustrates a second operational mode in which power generated by the PV module is supplied to a battery to charge the battery.
Figure 4:
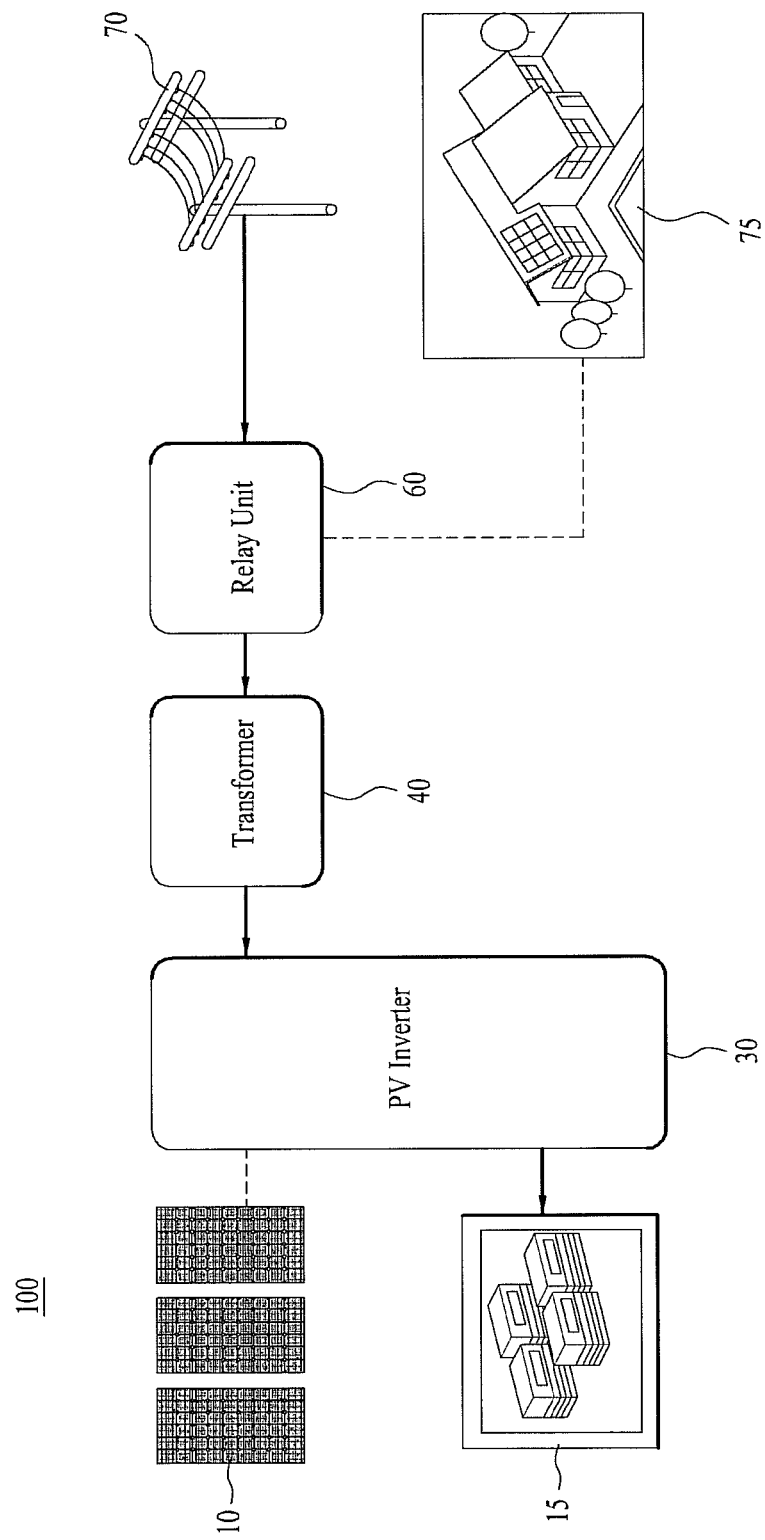
FIG. 4 illustrates a third operational mode in which power generated by the grid is supplied to the battery to charge the battery.
Figure 5:
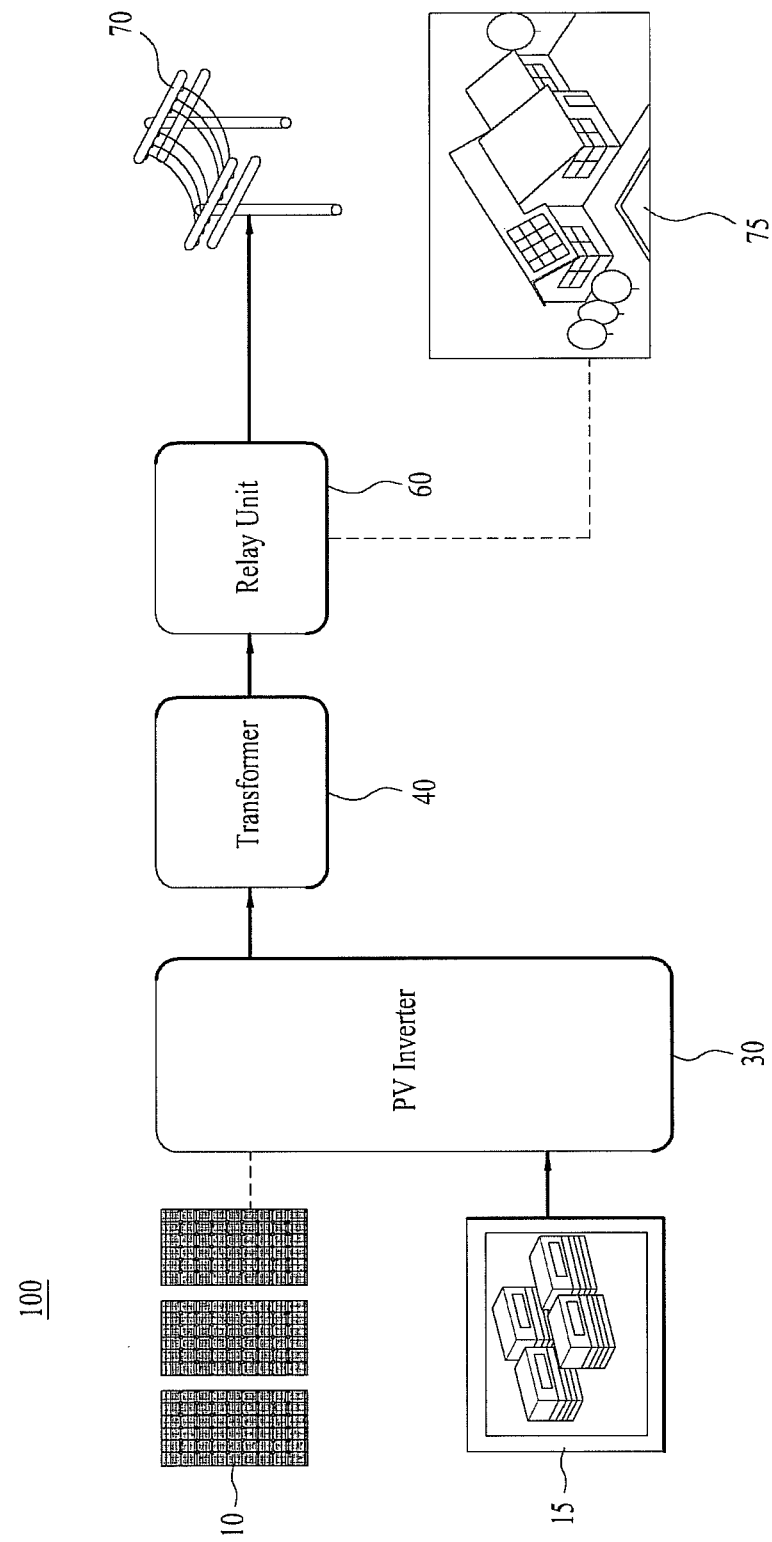
FIG. 5 illustrates a fourth operational mode in which power stored in the battery is sold and supplied to the grid.
Figure 6:
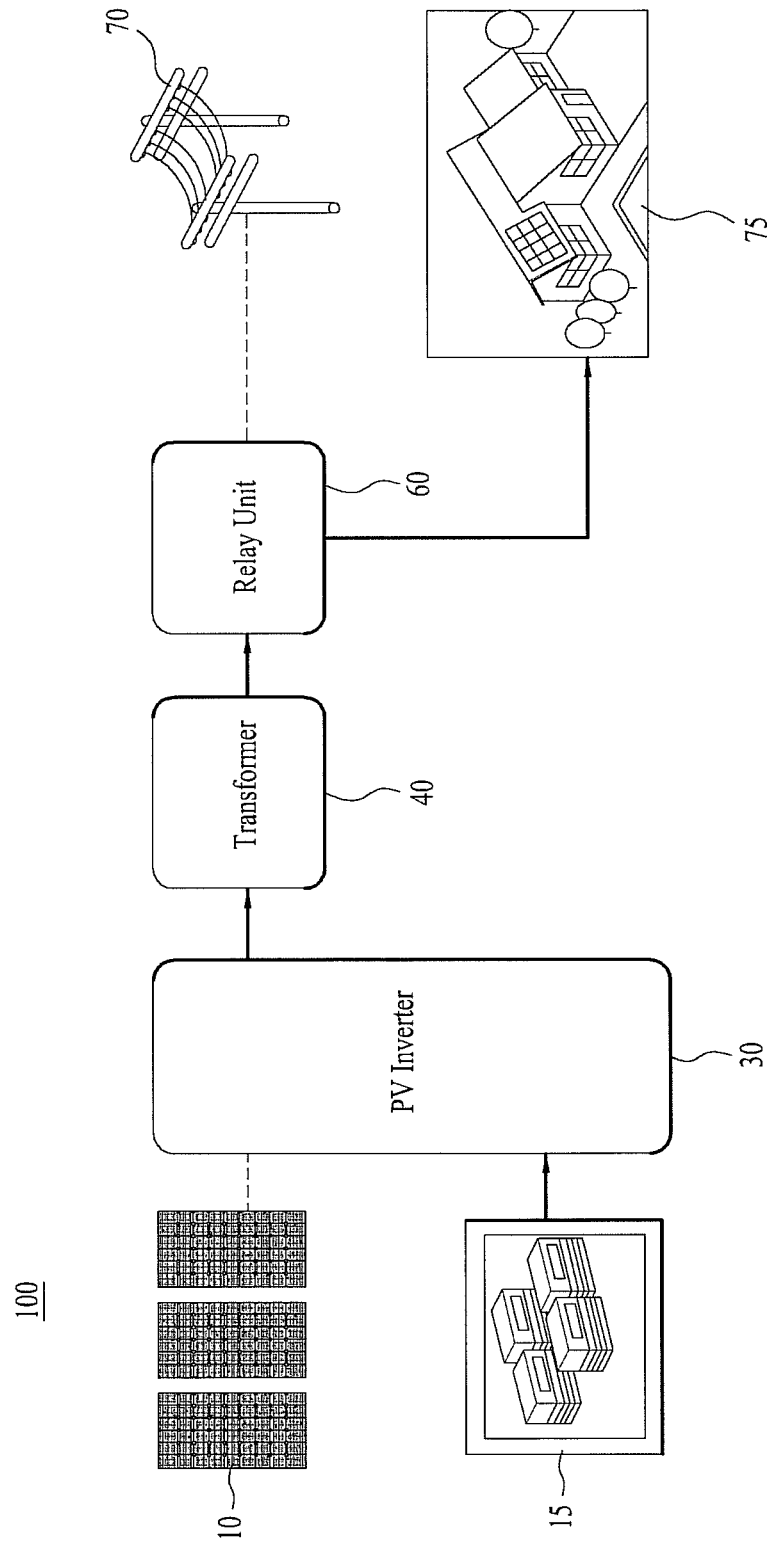
FIG. 6 illustrates a fifth operational mode in which power stored in the battery is supplied to a power load.
Figure 7:
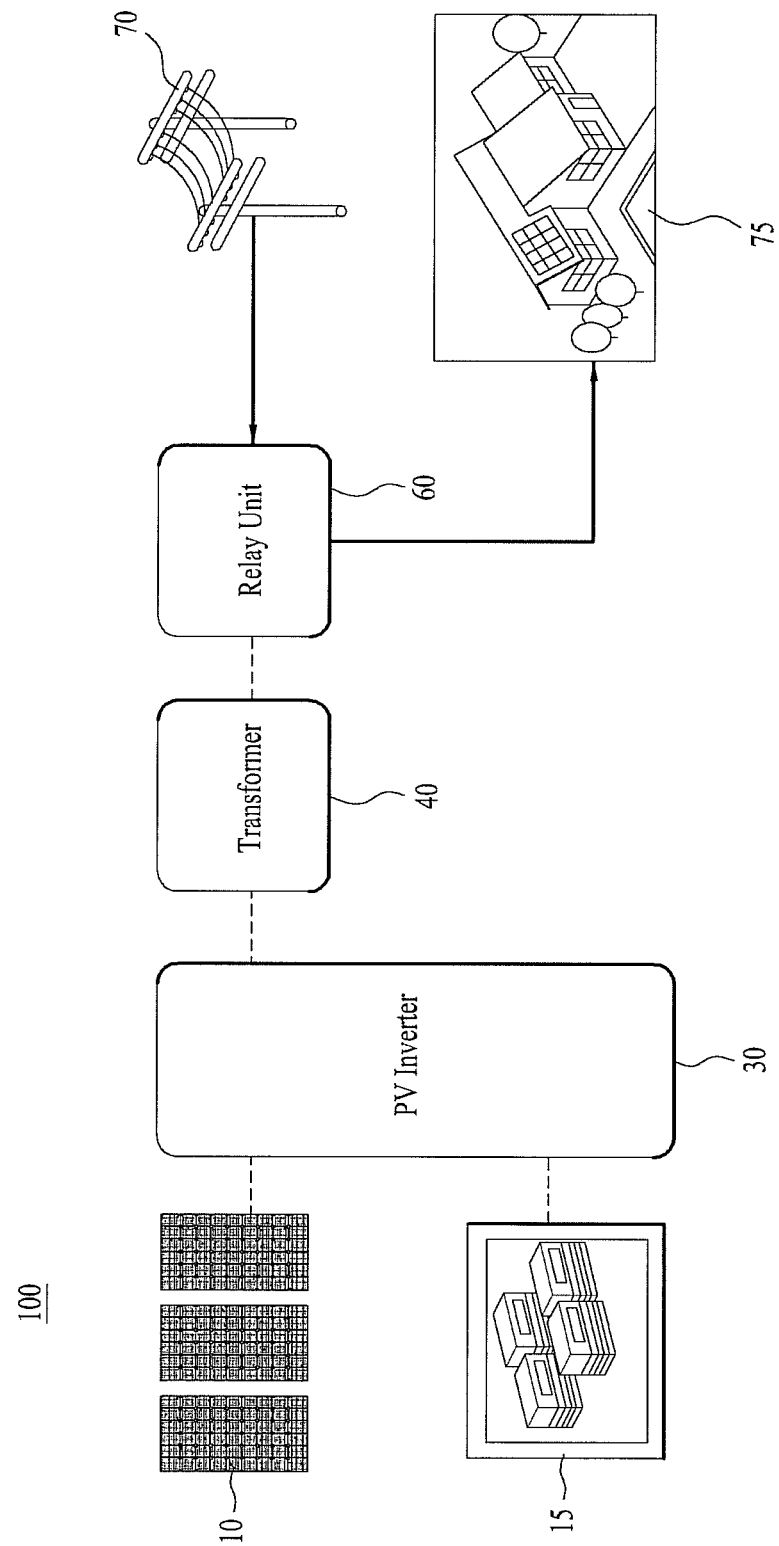
FIG. 7 illustrates a sixth operational mode in which, upon occurrence of a system error, the energy management system is disconnected from the PV processing system while the grid is connected to the power load.

FIG. 1 is a block diagram illustrating an example of an energy management system according to the present invention, FIG. 2 illustrates a first operational mode in which power generated by a PV module 10 is supplied to a grid 70 or power load 75, FIG. 3 illustrates a second operational mode in which power generated by the PV module 10 is supplied to a battery 15 to charge the battery 15, FIG. 4 illustrates a third operational mode in which power generated by the grid 70 is supplied to the battery 15 to charge the battery 15, FIG. 5 illustrates a fourth operational mode in which power stored in the battery 15 is sold and supplied to the grid 70, FIG. 6 illustrates a fifth operational mode in which power stored in the battery 15 is supplied to the power load 75, and FIG. 7 illustrates a sixth operational mode in which, upon occurrence of a system error, the energy management system 100 is disconnected from the PV processing system while the grid 70 is connected to the power load 75.

The PV module 10, which is a renewable energy generation module, may be constructed in a different form or in combination with wind power, fuel cells, or the like. Of course, the PV module in this embodiment may be replaced with a different renewable energy module.

Referring to FIG. 1 which shows a basic configuration of the energy management system according to the present invention, an example of the energy management system according to the present invention includes, as basic components, the PV module (or PV cell) 10 and/or the battery 15, a PV inverter 30, and the grid 70 or the power load 75 and may further include additional means as needed. In the following description, the basic components of the energy management system will first be described and then the additional means will be described in detail later when the operational modes of the energy management system are described.

First, the basic components are briefly described as follows. The PV module 10 is an assembly of one or more PV arrays which collects and converts PV energy to an electrical signal (i.e., DC power).

The battery 15 charges power supplied from the PV module 10 or the grid 70 or discharges power stored in the battery 15 to the grid 70 and/or the power load 75.

The PV inverter 30 converts and/or inverts DC power received (input) from between the PV module 10, the battery 15, the grid 70, and the power load 75 according to an operational mode that will be described later. To accomplish this, the PV inverter 30 includes a DC/DC converter 32 that boosts or buck-converts input DC power and a DC/AC inverter 34 that inverts input DC power to AC power.

Here, one or both of the DC/DC converter 32 and the DC/AC inverter 34 in the PV inverter 30 may be used according to the operational mode described later. The PV inverter 30 according to the present invention may function as a PV Power Conditioning System (PCS), for example, when it is a grid-connected PV inverter, and may function as an inverter charger in association with the battery 15.

Since the PV inverter 30 functions as an inverter charger, the energy management system 100 may include a separate inverter charger (or battery charger) for the battery 15, for example, when only the PV module is provided.

In addition, the PV inverter 30 may be controlled, for example, by an external device (not shown) according to various communication protocols such as RS485. Examples of the external device may include a control component in a smart grid environment. That is, the PV inverter 30 which will perform a variety of operational modes in the energy management system may operate under control of the control component in the smart grid environment.

Referring to FIG. 1, the energy management system according to an embodiment of the present invention may include multiple input terminals, i.e., may have a multi-string structure. Here, the multiple input terminals may be connected to the same component or may be connected to different components. For example, FIG. 1 illustrates a multi-string structure including two input terminals in which the first input terminal is connected to the PV module 10 and the second input terminal is connected to the battery 15. In association with the multi-string structure, the embodiment of the present invention is illustrated with reference to an example in which only one PV inverter 30 operates in connection with the two input terminals. In this case, a connection between the PV inverter 30 and the input terminals may be controlled through a relay. Although it is assumed in the example of FIG. 1 that only two input terminals are provided as described above, this is purely exemplary and it will be apparent that more than two modules including the PV module 10 and the battery 15 may also be connected to the PV inverter 30 through more than two input terminals.

The load 75 may include a critical load such as a computer or lighting and a general power load such as Heating, Ventilation, and Air Conditioning (HVAC) devices and home appliances.

A method for controlling an energy management system, which includes a photovoltaic (PV) module for generating power and a battery for storing power and which is connected to a grid as an external power supplier and a power load as a power consumer, according to an embodiment of the present invention may include a power determination process including determining an amount of power generated by the PV module, an amount of power stored in the battery, an amount of power consumed by the power load, and an amount of power required by the grid and a power distribution process including distributing the power generated by the PV module, the power stored in the battery, and the power supplied by the grid to the battery, the power load, and the grid according to the amount of generated power, the amount of stored power, the amount of consumed power, and the amount of required power determined in the power determination process.

In the method for controlling the energy management system according to the embodiment of the present invention, in the power distribution process, a pattern of power supply and reception through the battery and the external grid may be determined differently according to the current amount of generated power, the current amount of stored power, the current amount of consumed power, and the current amount of required power determined in the power determination process.

In addition, in the method for controlling the energy management system according to the embodiment of the present invention, in the power distribution process, a pattern of power supply through the module may be determined differently according to a result of the determination in the power determination process.

Here, the PV module 10 may be a power supplier and the battery 15 and the external grid 70 may be a power supplier and a power receiver, respectively. The power load 75 may be a power receiver. Accordingly, it is preferable that the current states of the PV module 10, the battery 15, and the grid 70, and the power load 75 be determined and a pattern of power supply and reception be determined differently according to the determined current states.

That is, a pattern of power supply and reception in association with the battery 15 may be determined according to the determined current states. Namely, a pattern of power supply and reception with respect to the battery 15 may be changed according to the determined current states.

Similarly, a pattern of power supply and reception in association with the grid 70 may be determined according to the determined current states. In addition, a pattern of power supply from the module 10 may also be determined according to the determined current states. That is, from the viewpoint of power supply, a pattern associated with a power receiver to which a power supplier supplies power is changed and, from the viewpoint of power reception, a pattern associated with a power supplier from which power is received is changed according to the determined current states.

The energy management system which is controlled according to the method according to the embodiment of the present invention may operate in various operational modes, typically in the following operational modes. In the drawings, a solid line denotes an actually supplied power flow and a dotted line between two blocks denotes a state in which the two blocks are connected such that power can be supplied therebetween.

For example, the 1st operational mode is a mode in which power generated by the PV module 10 is preferentially supplied to the power load 75 or to the grid 70. Power flow in the 1st operational mode is illustrated in FIG. 2 which is a simplified drawing of FIG. 1. The 2nd operational mode is a mode in which power generated by the PV module 10 is supplied to the battery 15 to store power in the battery 15. Power flow in the 2nd operational mode is illustrated in FIG. 3 which is a simplified drawing of FIG. 1. The 3rd operational mode is a mode in which power generated by the grid 70 is supplied to the battery 15 to store power in the battery 15. Power flow in the 3rd operational mode is illustrated in FIG. 4 which is a simplified drawing of FIG. 1. The 4th operational mode is a mode in which power stored in the battery 15 is supplied to the grid 70. Power flow in the 4th operational mode is illustrated in FIG. 5 which is a simplified drawing of FIG. 1. The 5th operational mode is a mode in which power stored in the battery 15 is supplied to the power load 75. Power flow in the 5th operational mode is illustrated in FIG. 6 which is a simplified drawing of FIG. 1. The 6th operational mode is a mode in which, upon occurrence of a system error, the energy management system is disconnected from the grid 70 or the power load 75 and the grid 70 is connected to the power load 75. Power flow in the 6th operational mode is illustrated in FIG. 7 which is a simplified drawing of FIG. 1.

Each of the above operational modes is described below in more detail with reference to the illustrated configurations and power paths of the energy management system.

[1st Operational Mode]

The 1st operational mode is a mode in which power generated by the PV module 10 is supplied to the grid 70 or the power load 75.

In the 1st operational mode, power generated by the PV module 10 may be preferentially supplied to the power load 75.

That is, power generated by the PV module 10 may be preferentially supplied to the power load 75 in the case in which the amount of power consumed by the power load 75 measured in the power measurement process is greater than a predetermined amount of consumed power and the amount of power generated by the PV module 10 is greater than a predetermined amount of generated power.

In the 1st operational mode, DC power generated by the PV module 10 may be supplied to the power load 75 or may be sold and supplied to the grid 70 when power is not consumed in the power load 75.

The above procedure is described below in detail with reference to FIGS. 1 and 2.

DC power generated by the PV module 10 is filtered at the DC noise filter 20.

The PV inverter 30 performs, on the filtered DC power, processing required to supply the filtered DC power to the grid 70 or the power load 75.

For example, when the filtered DC power is input to the DC/DC converter 32 through a DC reactor 23, the DC/DC converter 32 controls switching of switching devices to convert the DC power to a voltage of a DC link terminal 33. In this specification, the switching device is exemplified by an Insulated Gate Bipolar Transistor (IGBT). IGBTs at an upper portion in the figure are referred to as top switches T1 and T2 and IGBTs at a lower portion are referred to as bottom switches B1 and B2. The bottom switch B1 connected to the DC reactor 23 is turned on to perform a switching operation and the top switch T1 is turned off to allow energy to be delivered to the DC link terminal 33 through a diode.

Figure 8:
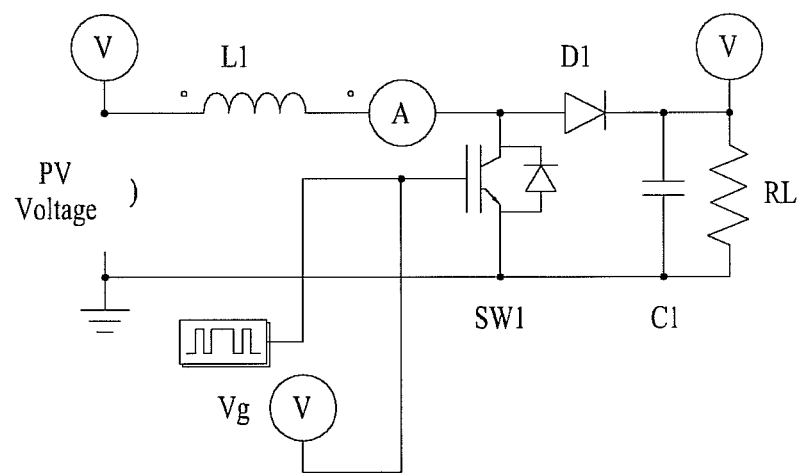
FIG. 8 is an exemplary circuit diagram of the DC/DC converter in the PV inverter in the energy management system according to the present invention and FIGS. 9 and 10 are exemplary graphs showing respective operations of portions of the DC/DC converter.

This procedure is described below in more detail with reference to the drawings. FIG. 8 is an exemplary circuit diagram of the DC/DC converter 32 in the PV inverter in the energy management system according to the present invention and FIGS. 9 and 10 are exemplary graphs showing respective operations of portions of the DC/DC converter 32.

Specifically, FIG. 8 illustrates an exemplary equivalent circuit of the DC/DC converter 32 that performs a procedure for converting power output from the PV module 10 and storing the converted power in the DC link terminal 33. In FIG. 8, the DC reactor 23 is denoted by "L1", the bottom switch B1 is denoted by "SW1", the diode that is used when the switch T1 is off is denoted by "D1", and the DC link terminal 33 is denoted by "C1" for ease of explanation.

Figure 9:
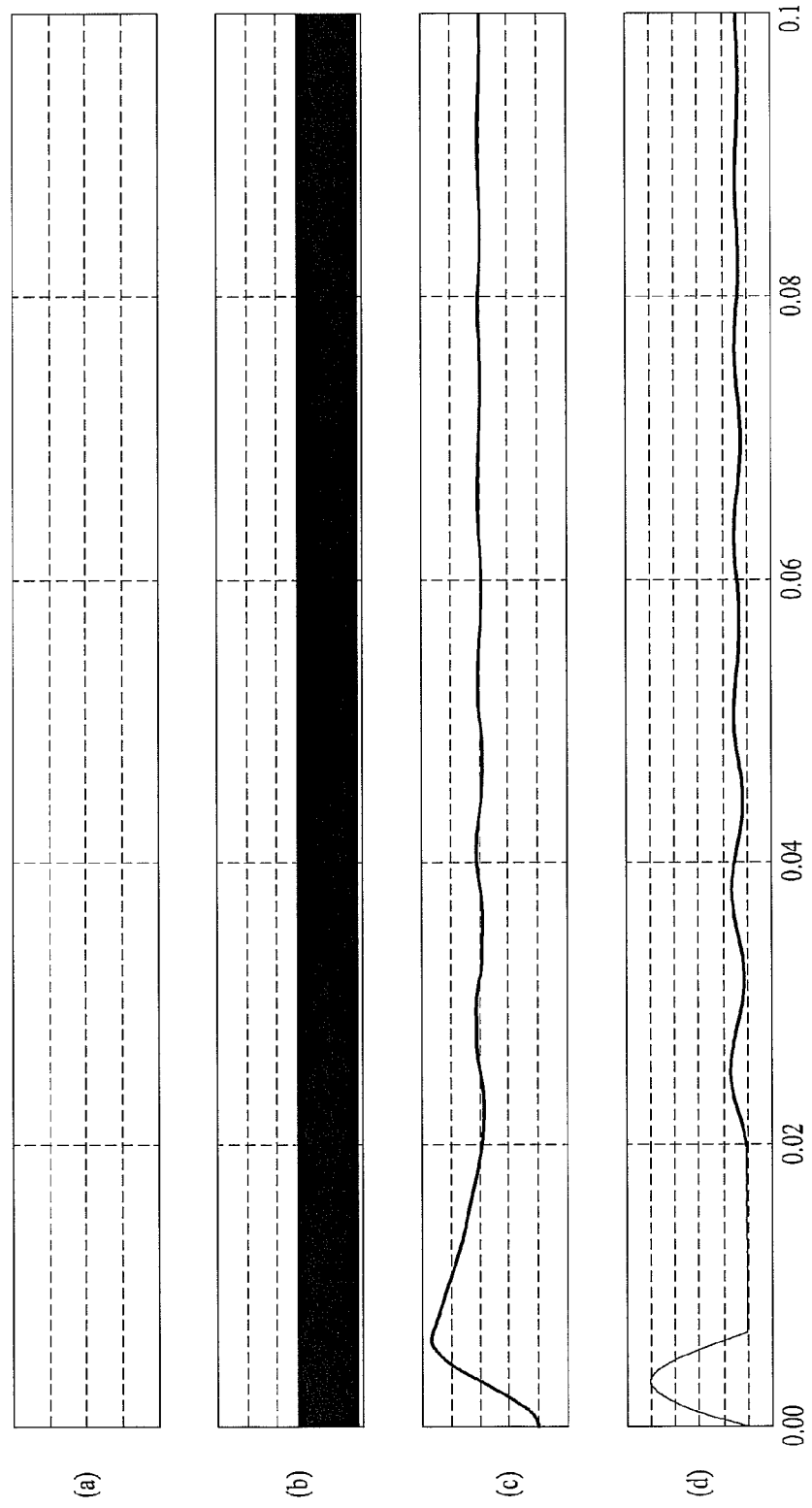
Figure 10:
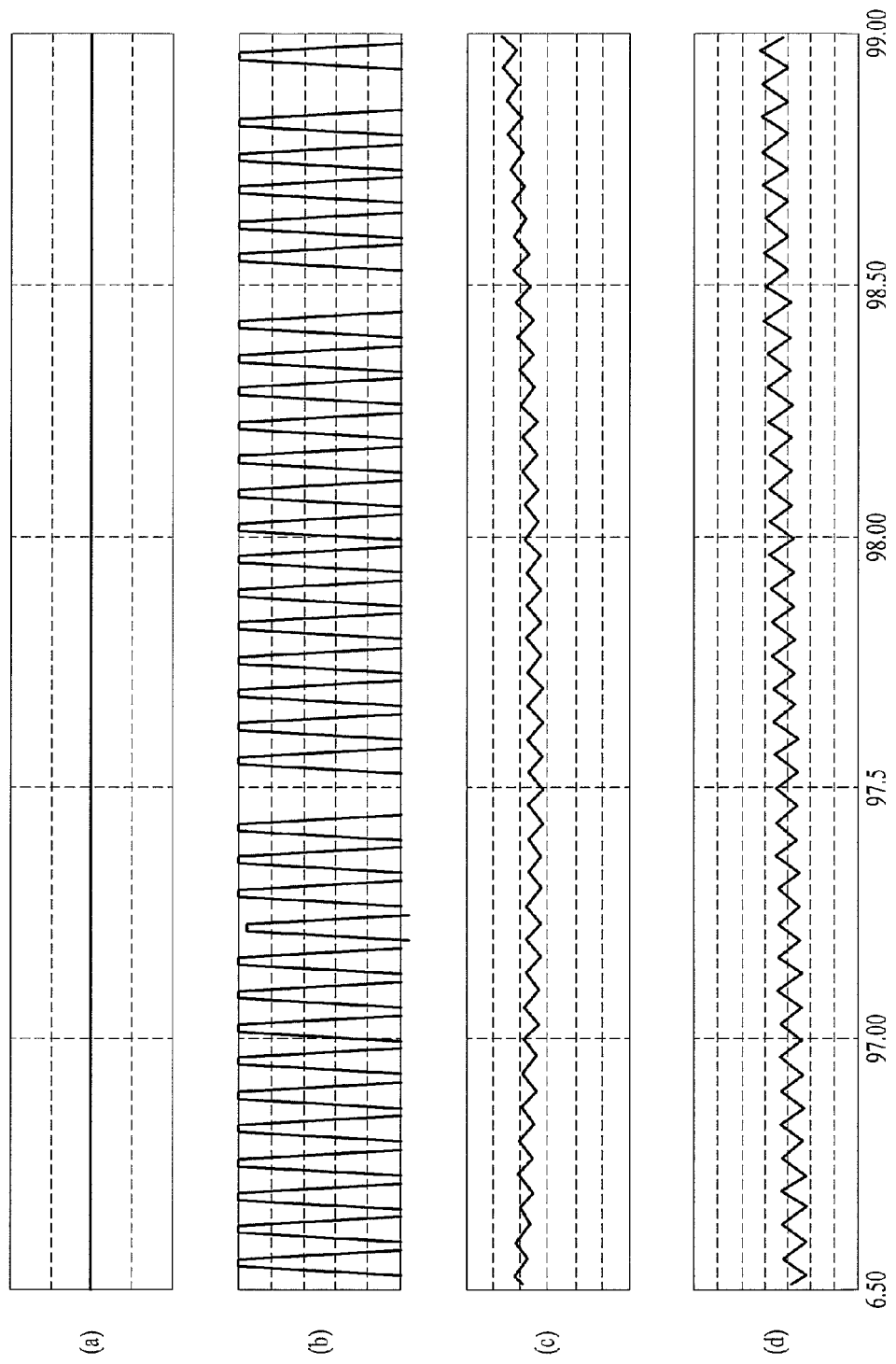

FIGS. 9 and 10 are detailed graphs showing measurements by voltage meters V1, V2, and V3 and a current meter 11 connected to the portions of the DC/DC converter 32 shown in FIG. 8.

Specifically, FIG. 9(*a*) is a graph showing a DC power (=DC voltage) generated by the PV module 10, FIG. 9(*b*) is a graph showing a Pulse Width Modulation (PWM) signal input to a gate of the switch SW1 for switching the switch SW1, FIG. 9(*c*) is a graph showing a voltage at the DC link terminal 33, and FIG. 9(*d*) is a graph showing the amount of change of current at the inductor L1.

FIGS. 10(*a*) to 10(*d*) are enlarged graphs of marked portions 300 of FIGS. 9(*a*) to 9(*d*). Here, the marked portions 300 of FIGS. 9(*a*) to 9(*d*) may be portions at which DC power boosted by the DC/DC converter 32 is stabilized.

Referring to FIG. 8, the DC/DC converter 32 functions in the following manner. As shown in FIG. 9(*a*), a DC power is input to the DC/DC converter 32 from the PV module 10 as shown in FIG. 9(*a*). When a PWM signal is input to the gate of the switch SW1 as shown in FIG. 9(*b*), the switch SW is switched on or off.

For example, when the switch SW1 is turned on by the PWM signal, current in the inductor L1 is increased by the DC voltage input to the PV module 10 to allow energy to be stored in the inductor L1. On the other hand, when the switch SW1 is turned off by the PWM signal, energy stored in the inductor L1 is delivered to the power load $R_L$ to allow energy to be stored in a capacitor C1. When the switch SW1 is on, the circuit is opened to allow the voltage (or power) stored in the capacitor C1 to be delivered to the power load RL, thereby generating sawtooth waveforms as shown in FIG. 9(c) or 10(c). In addition, when the switch SW1 is on, the inductor L1 repeats charge and discharge operations, thereby generating sawtooth waveforms as shown in FIG. 9(d) or 10(d). In this case, the increased voltage, i.e., the voltage of the DC link terminal 33, is determined according to a PWM on/off duty ratio as shown in FIG. 9(b) or FIG. 10(b).

As described above, in FIG. 1, the PV inverter 30 also serves as an inverter charger for the battery 15. As a result, the DC/DC converter 32 operates in the same manner in a discharge mode of the battery 15, for example, during a buck operation of the DC converter in the fifth operational mode or the sixth operational mode.

The DC/DC converter 32 does not always boost DC power input to the DC/DC converter 32. That is, although the DC/DC converter 32 functions to boost input DC power, the DC/DC converter 32 may measure the level of the input DC power and bypass the input DC power upon determining that there is no need to boost the measured level of the DC power.

The DC/AC inverter 34 converts a DC power input from the DC link terminal 33 to AC power by switching the IGBT devices.

Figure 11:
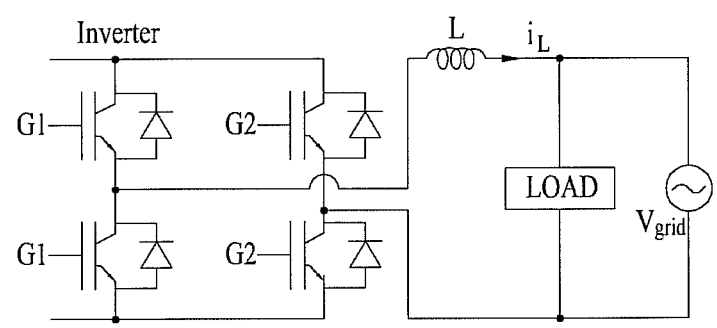

This procedure is described in more detail as follows with reference to the drawings. FIG. 11 is an exemplary circuit diagram of the DC/AC inverter 34 in the PV inverter in the energy management system according to the present invention and FIGS. 12 and 13 are exemplary graphs showing respective operations of portions of the DC/AC inverter 34.

Specifically, FIG. 11 illustrates an exemplary equivalent circuit of the DC/AC inverter 34 that performs a procedure for inverting energy (i.e., DC power) stored in the DC link terminal 33 to AC power. In FIG. 11, the switch T1 in the DC/AC inverter 34 in FIG. 1 is denoted by "G1", T2 is denoted by "G2", B1 is denoted by "G3", B2 is denoted by "G4", and the AC reactors 35 are denoted by "L", and current flowing in L is denoted by "IL". The voltage of the DC link terminal 33 is denoted by "$V_{dc}$".

Figure 12:
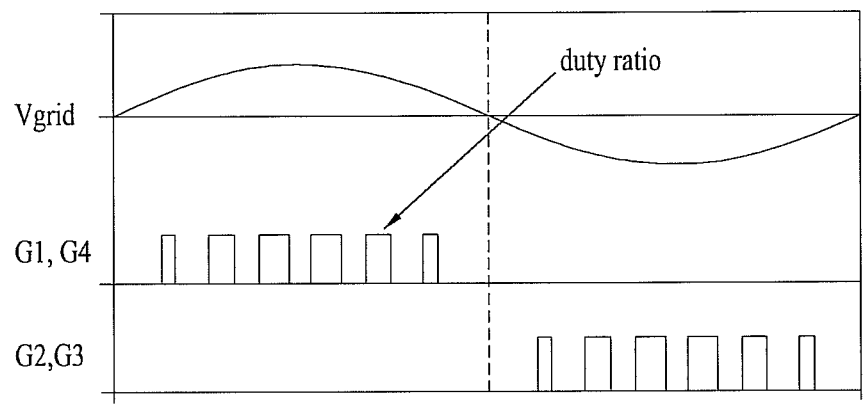

FIG. 12 is an exemplary graph showing a waveform of a PWM signal for controlling switching operations of the switching devices G1 to G4 of the DC/AC inverter 34.

FIG. 13 is a drawing illustrating flow of current as the switching devices of the DC/AC inverter 34 are turned on/off according to the PWM signal of FIG. 12 and a relationship with voltage of the grid 70.

For example, based on the PWM waveform shown in FIG. 12, the DC/AC inverter 34 controls the PWM duty ratio to turn the switching devices G1 and G4 on and then to turn the switching devices on. Such a PWM waveform is repeatedly input.

Here, in the former case, i.e., when the switching devices G1 and G4 are turned on according to the PWM waveform, a current flow in the circuit of FIG. 11 forms a loop through the switching device G4 via the switching device G1 as shown in FIG. 13(a). Here, the grid voltage, which is denoted by "$V_{grid}$" in FIG. 12, is in the form of a curve ($V_{grid}>0$) as shown in FIG. 13(a).

On the other hand, when the switching devices G2 and G3 are turned on according to the PWM waveform, a current flow in the circuit of FIG. 11 forms a loop through the switching device G3 via the switching device G2 as shown in FIG. 13(b). This current flow is opposite to that of FIG. 13(a). In addition, the grid voltage, which is denoted by "$V_{grid}$" in FIG. 12, is in the form of a curve ($V_{grid}<0$) as shown in FIG. 13(b).

By repeating such operations, the DC voltage of the DC link terminal 33 is inverted to an AC voltage.

The inverted AC voltage is transformed to a desired level by the transformer 40 and is then supplied to the grid 70 or the power load 75. Here, the energy management system may further include a relay unit 69 including relays 61 to 64 between the grid 70 and the power load 75 and may allow the transformed AC voltage to be supplied to a destination through the relays 61 to 64 of the relay unit 60.

In addition, the energy management system may perform filtering on the AC voltage transformed by the PV inverter 30 using the AC noise filter 50. The PV inverter 30 converts the AC voltage into an AC voltage appropriate for a predetermined destination, i.e., the grid 70 or the power load 75.

[2nd Operational Mode]

The 2nd operational mode is associated with a procedure in which DC power generated by the PV module 10 is supplied to and stored in the battery 15.

The procedure of the 2nd operational mode is described below mainly focusing on portions different from the 1st operational mode and, for details of the operations or processes equal or similar to those of the 1st operational mode, reference can be made to the above description of the 1st operational mode and a detailed description thereof is omitted herein.

A procedure in the 2nd operational mode, in which DC power generated by the PV module 10 is converted by the DC/DC (buck) converter 32 in the PV inverter 30 via the DC noise filter 20 and corresponding energy is then stored in the DC link terminal 33, is similar to the corresponding procedure in the 1st operational mode. Accordingly, for this procedure, one can refer to the above description of the 1st operational mode or one can derive details of this procedure from the above description of the 1st operational mode.

Referring to FIGS. 1 and 3, when energy (i.e., a DC voltage) is stored in the DC link terminal 33 through switching of the switching devices T1 and B1 according to the first operational mode, the DC voltage applied to the DC link is then stored in the battery 15 through switching of the switching devices T2 and B2.

For example, DC power is stored in the DC link terminal 33 by turning the switching device T1 off and turning the switching device B1 on through the same procedure as in the 1st operational mode. Thereafter, in the 2nd operational mode, the power of the DC link terminal 33 is delivered to the battery 15 in a manner opposite to that described above by turning the switching device T2 on and turning the switching device B1 off unlike the 1st operational mode.

[3rd Operational Mode]

The 3rd operational mode is associated with a procedure in which power is not supplied from the grid 70 rather than from the PV module 10 although power is supplied to and stored in the battery similar to the 2nd operational mode.

A procedure in which power supplied from the grid 70 is stored in the battery 15 in the 3rd operational mode is briefly described below with reference to FIGS. 1 and 4. AC power generated by the grid 70 is supplied to the PV inverter 30 via the AC noise filter 50, the transformer 40, and the AC reactors 35. The DC/AC inverter 34 in the PV inverter 30 performs a procedure in a manner opposite to the procedure of FIGS. 11 to 13 described above to invert the AC power to DC power and output the DC power to the DC link terminal 33 such that corresponding energy is stored in the DC link terminal 33. The energy stored in the DC link terminal 33 is converted by the DC/DC (buck) converter 32 and the converted power is then stored in the battery 15.

The switching operation of the DC/DC (buck) converter 32 is similar to the switching operation of the DC/DC converter in the 2nd operational mode described above and a detailed description of the switching operation is omitted herein such that, for details of the switching operation, reference can be made to the description of the 2nd operational mode.

The 3rd operational mode may be used when the PV module 10 malfunctions due to an internal error of the PV module 10 or when it is difficult for the PV module 10 to supply power due to environments or other conditions. For example, assuming that the energy management system 100 is associated with a smart grid environment, the 3rd operational mode may be used when storing power generated by the grid 70 in the battery 15 is cheaper than storing power generated by the PV module 10 in the battery 15.

[4th Operational Mode]

The 4th operational mode is associated with a procedure in which DC power stored in the battery 15 is discharged and supplied to the grid 70 rather than supplying DC power generated by the PV module 10 to the grid 70. The procedure of the 4th operational mode is similar to the procedure for supplying power to the grid in the 1st operational mode and is a reversal of the procedure of the 3rd operational mode.

Here, the 4th operational mode may be used when a sufficient amount of DC power has been stored in the battery 15 in the case in which it is difficult for the PV module 10 to supply power, similar to the 3rd operational mode. Here, the sufficient amount of DC power may indicate, for example, that DC power has been stored in the battery 15 to the extent that the battery 15 cannot be further charged.

Referring to FIGS. 1 and 5, the overall procedure of the 4th operational mode is similar to that of the 1st operational mode, except that the PV module 10 is replaced with the battery 15. However, in the 4th operational mode, the switching devices T2 and B2 in the DC/DC converter 32 serve the same functions as the switching devices T1 and B1 of the DC/DC converter 32 in the 1st operational mode. In addition, in the 4th operational mode, generated power may not pass through the DC noise filter 20 since the power is not generated by the PV module 10. The procedure subsequent to the DC link terminal 33 is almost the same as that of the 1st operational mode and, for details of the procedure, reference can be made to the above description of the 1st operational mode.

[5th Operational Mode]

The procedure of the 5th operational mode is similar to that of the 4th operational mode with the only difference being that power stored in the battery 15 is discharged (i.e., supplied) to the power load 75 rather than to the grid 70. Accordingly, the energy management system 100 may need to further include a relay unit 60 including relays 61 to 64 and a power load filter 73.

[6th Operational Mode]

In the case in which, unlike the 1st to 5th operational modes, an error has occurred in components of the system (for example, the PV module 10, the battery 15, and the PV inverter 30) upstream of the grid 70 or the power load 75, the system is disconnected from the grid 70 or the power load 75 and the grid 70 is connected to the power load 75 at a different time from the time of disconnection, i.e., when there is a need to supply power to the power load 75. That is, in the 6th operational mode, AC power generated by the grid 70 is directly supplied to the power load 75.

Although on/off control of each relay has not been described in detail in the above procedures, on/off control of each relay is basically performed as required in each operational mode.

For example, in the 1st operational mode, the 1st relay 22 and the 2nd relay 61 are turned on and the remaining relays are turned off. In the 2nd operational mode, the 1st relay 22 and the second relay 24 are turned on and the remaining relays are turned off. In the 3rd and 4th operational modes, the second relay 24 and the 3rd relay 61 are turned on and the remaining relays are turned off. In the 5th operational mode, the 2nd relay 24, the 4th relay 62, and the 6th relay 64 are turned on and the remaining relays are turned off. Finally, in the 6th operational mode, the 5th relay 63 and the 6th relay 64 are turned on and the remaining relays are turned off. These relays may be on/off controlled by a microcomputer that performs overall control of the energy management system.

Although all 6 operational modes can be implemented in the energy management system shown in FIG. 1, the present invention is not limited to the 6 operational modes and more various operational modes may also be implemented. That is, it will be apparent to those skilled in the art that the scope of the present invention is not limited to the 6 operational modes and the present invention can also be applied to various other operational modes, which can be implemented using the illustrated energy management system, in the same or similar principle as or to the principle described in this specification and such various operational modes are also within in the scope of the present invention.

Figure 14:
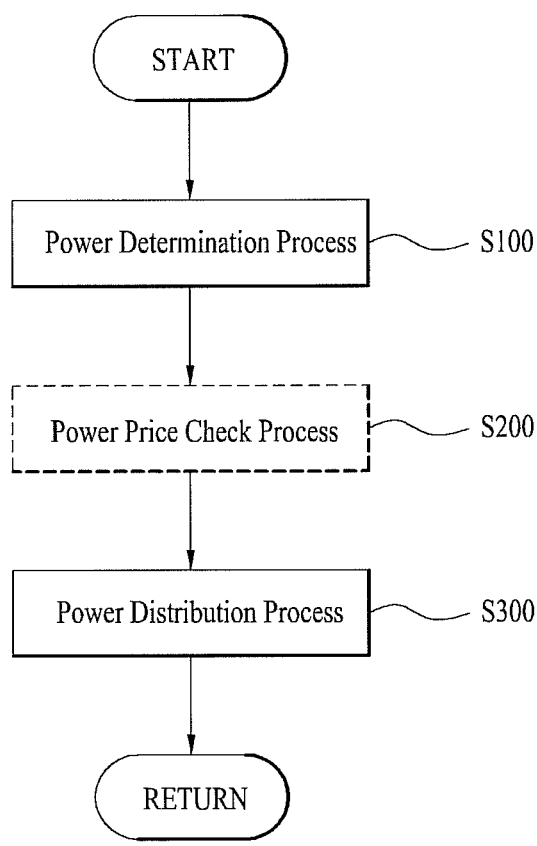
FIG. 14 is a flowchart illustrating a method for controlling an energy management system according to the present invention.

FIG. 14 is a flowchart illustrating a method for controlling an energy management system according to the present invention.

The method for controlling an energy management system, which includes a PV module for generating power and a battery 15 for storing power and which is connected to a grid as an external power supplier and a power load 75 as a power consumer, according to the present invention includes a power determination process S100 and a power distribution process S300.

In this method, the power determination process S100 includes determining an amount of power generated by the PV module 10, an amount of power stored in the battery 15, an amount of power consumed by the power load 75, and an amount of power required by the grid and the power distribution process S300 includes distributing the power generated by the PV module 10, the power stored in the battery 15, and the power supplied by the grid to the battery 15, the power load 75, or the grid according to the amount of generated power, the amount of stored power, the amount of consumed power, and the amount of required power determined in the power determination process S100 as described above.

The method may further include a power price check process S200 including receiving information associated with a power price from the grid (smart grid) before or after the power determination process S100 in order to determine whether or not power generated by the PV module is to be sold to the grid as needed.

The power determination process S100, the power price check process S200, or the power distribution process S300 may be repeated at intervals of a predetermined time.

In association with the first operational mode, when the amount of power consumed by the power load 75 determined in the power determination process S100 is greater than a predetermined amount of consumed power and the amount of generated power determined in the power determination process S100 is greater than a predetermined amount of generated power, the power generated by the PV module 10 may be preferentially supplied to the power load 75 and surplus power may be supplied to the grid. Of course, the power generated by the PV module 10 may also be first supplied to the grid.

In association with the second operational mode, the power generated by the PV module 10 may be supplied to the battery 15 in the power distribution process S300.

Of course, only an amount of power by which the power generated by the PV module 10 exceeds the amount of power consumed by the power load 75 may be supplied to the battery 15 or the grid.

The energy management system may supply power generated by the PV module 10 to the grid in the case in which the energy management system has received a power supply request signal from the grid.

The energy management system may supply the power supplied by the grid to the battery 15 to store the power in the battery 15 in the power distribution process S300 upon determining that the amount of power stored in the battery 15 determined in the power determination process S100 is equal to or less than a first predetermined amount of stored power P1.

However, in a smart grid in which power price varies, the power distribution process S300 may include supplying power to the battery 15 only when a power price checked through the power price check process is equal to or less than a predetermined price.

The power distribution process S300 may be continued until the amount of power stored in the battery 15 reaches a second predetermined amount of stored power P2.

In association with the fourth operational mode, upon receiving a power supply request signal from the grid, the energy management system may supply power stored in the battery 15 to the grid to sell the power to the grid in the power distribution process S300.

The power stored in the battery 15 may be sold to the grid until the amount of power stored in the battery 15 is reduced to a predetermined amount of stored power P3.

In association with the fifth operational mode, upon determining in the power determination process S100 that the amount of power consumed by the power load 75 is equal to or greater than a predetermined amount of consumed power and the amount of power supplied by the grid is equal to or less than a predetermined amount of supplied power, the energy management system may supply power stored in the battery 15 to the power load 75 in the power distribution process S300.

That is, when power of the grid is cut off, the energy management system may supply power from the battery 15 to the power load 75 after disconnecting the power load 75 from the grid such that the battery 15 operates as an uninterruptible power supply (UPS).

Thus, the energy management system can supply high-quality regulated power by avoiding power failure that may occur in the grid.

The power stored in the battery 15 may be supplied to the power load 75 not only in the case in which the amount of power supplied by the grid is equal to or less than a predetermined amount but also in the case in which power supply by the grid is abnormal due to disorder of the grid and in the case in which a peak power price zone is reached when a smart grid is used.

In addition, in association with the sixth operational mode, upon determining in the power determination process S100 that the PV module 10 and the battery 15 operate abnormally, the energy management system may directly supply power from the grid to the power load 75 in the power distribution process S300 to minimize user inconvenience.

An inverter or converter in the system may malfunction when the power load 70 does not consume power. Thus, upon determining in the power determination process S100 that the power load 70 does not consume power, the system may be disconnected from the grid and the power load and may be kept inactive to prevent spread of the influence of such malfunction until the system is repaired by a manager.

The embodiments have been described as examples to provide a detailed explanation of the spirit of the present invention. Thus, it will be apparent to those skilled in the art that the present invention is not limited to the above embodiments and various modifications are possible and various other embodiments according to the spirit of the present invention are also included in the scope of the present invention.

What is claimed is:

1. A method for controlling an energy management system to connect to a grid and to connect to a power load, the energy management system including a renewable energy generation module to generate power and a battery, the method comprising:

performing a power determination process that includes determining an amount of first power generated by the energy generation module, determining an amount of second power in the battery, determining an amount of third power consumed by the power load, and determining an amount of fourth power for the grid, wherein the fourth power for the grid is different than the third power consumed by the power load; and performing a power distribution process that includes distributing at least a portion of the first power generated by the energy generation module, distributing at least a portion of the second power in the battery, and distributing at least a portion of the third power supplied by the grid to the battery, to the power load, or to the grid based on the determined amount of the first power, the determined amount of the second power, the determined amount of the third power, and the determined amount of fourth power, wherein the energy generation module includes a photovoltaic (PV) module, and wherein the power distribution process includes a first operational mode in which power generated by the PV module is preferentially supplied to the power load or to the grid, a second operational mode in which power generated by the PV module is supplied to the battery, to store power in the battery, a third operational mode in which power generated by the grid is supplied to the battery, to store power in the battery, a fourth operational mode in which power stored in the battery, is supplied to the grid, a fifth operational mode in which power stored in the battery, is supplied to the power load, and a sixth operational mode in which, upon occurrence of a system error, the energy, management system is disconnected from the grid or the power load and the grid is connected to the power load, wherein direct current (DC) power generated by the PV module is filtered at a DC noise filter before distributing the first power, and wherein the filtered DC power is processed to supply the filtered DC power to the grid or the power load, wherein during the third operational mode, AC power generated by the grid is supplied to a PV inverter via an AC noise filter, a transformer and AC reactors, the PV inverter inverting AC power to DC power for output to a DC power storing terminal such that energy stored in the DC terminal is converted by a DC/DC buck converter for battery storage.

2. The method according to claim 1, wherein performing the power determination process includes repeating the power distribution process at intervals of a predetermined time.

3. The method according to claim 1, wherein performing the power distribution process includes supplying at least a portion of the first power generated by the energy generation module to the power load when the determined amount of fourth power consumed by the power load is greater than a predetermined amount of consumed power and the determined amount of generated first power is greater than a predetermined amount of generated power.

4. The method according to claim 3, wherein performing the power distribution process includes supplying to the battery or the grid an amount of power by which the first power generated by the energy generation module exceeds the amount of third power consumed by the power load.

5. The method according to claim 4, wherein the energy management system supplies first power generated by the energy generation module to the grid in response to receiving a power supply request signal from the grid.

6. The method according to claim 1, wherein performing the power distribution process includes the energy management system providing the fourth power supplied by the grid to the battery based on the determination that the determined amount of second power stored in the battery is equal to or less than a first predetermined amount of stored power.

7. The method according to claim 6, wherein performing the power distribution process includes supplying power to the battery when a price of power supplied by the grid is equal to or less than a predetermined price.

8. The method according to claim 7, further comprising performing a power price check process that includes determining a price of power supplied by the grid.

9. The method according to claim 8, wherein performing the power price check process includes repeating the power price check repeatedly at intervals of a predetermined time.

10. The method according to claim 6, wherein performing the power distribution process continues until the amount of second power stored in the battery reaches a second predetermined amount of stored power.

11. The method according to claim 1, wherein performing the power distribution process includes receiving, at the energy management system, a power supply request signal from the grid, and supplying second power stored in the battery to the grid.

12. The method according to claim 11, wherein in response to determining that the determined amount of the second amount of power stored in the battery is reduced to a predetermined amount of stored power, performing the power distribution process includes the energy management system stopping supplying of power to the grid.

13. The method according to claim 1, wherein in response to determining that the determined amount of the third power consumed by the power load is equal to or greater than a predetermined amount of consumed power and the determined amount of the fourth power supplied by the grid is equal to or less than a predetermined amount of supplied power, performing the power distribution process includes the energy management system supplying second power stored in the battery to the power load.

14. The method according to claim 1, wherein in response to determining that the energy generation module or the battery operate abnormally, performing the power distribution process includes the energy management system directly supplying power from the grid to the power load.

15. The method according to claim 1, further comprising converting the DC power into an AC power appropriate for the grid or the power load, wherein the AC power is filtered by a AC noise filter.

16. The method according to claim 1, wherein a PV inverter performs a function of inverter charger.

* * * * *